US010588459B2

(12) United States Patent
Browning

(10) Patent No.: US 10,588,459 B2
(45) Date of Patent: Mar. 17, 2020

(54) OUTDOOR STRUCTURE AND METHODS

(71) Applicant: Oldcastle Architectural, Inc., Atlanta, GA (US)

(72) Inventor: Leonard Browning, Shorewood, IL (US)

(73) Assignee: Oldcastle Architectural, Inc., Atlanta, GA (US)

( * ) Notice: Subject to any disclaimer, the term of this patent is extended or adjusted under 35 U.S.C. 154(b) by 0 days.

(21) Appl. No.: 15/296,727

(22) Filed: Oct. 18, 2016

(65) Prior Publication Data

US 2018/0103756 A1 Apr. 19, 2018

(51) Int. Cl.
*A47J 37/07* (2006.01)
*E04H 1/12* (2006.01)

(52) U.S. Cl.
CPC ........ *A47J 37/0786* (2013.01); *E04H 1/1205* (2013.01); *A47J 37/0781* (2013.01)

(58) Field of Classification Search
CPC ..... A47B 47/0091; A47B 77/06; A47B 77/08; A47B 77/022; A47J 37/07; A47J 37/0786
USPC ........ 312/257.1, 263, 100, 409; 52/64, 79.1, 52/79.5
See application file for complete search history.

(56) References Cited

U.S. PATENT DOCUMENTS

| | | | | |
|---|---|---|---|---|
| 2,345,792 A * | 4/1944 | Cann | ................... | H01M 2/1072 174/153 R |
| 3,350,827 A | 11/1967 | Sugar | | |
| 4,642,960 A * | 2/1987 | Wallover, III | ........ | E04B 2/8605 52/385 |
| D299,305 S * | 1/1989 | Vollborn | ........................ | D7/332 |
| 5,184,886 A * | 2/1993 | Handley | ................ | A47B 69/00 312/107 |
| 2004/0065313 A1* | 4/2004 | Thompson | ............. | A47B 77/02 126/37 R |
| 2005/0257475 A1* | 11/2005 | Gong | ................... | E04F 13/0862 52/506.05 |
| 2006/0202594 A1 | 9/2006 | DeMars | | |
| 2006/0233981 A1* | 10/2006 | Straka | ................. | B28B 23/0075 428/34.4 |
| 2007/0169429 A1* | 7/2007 | Wu | ........................ | A47B 85/00 52/405.4 |
| 2008/0148663 A1* | 6/2008 | Peede | ...................... | E04C 2/296 52/309.9 |
| 2008/0163564 A1* | 7/2008 | Jarski | ...................... | A47B 43/00 52/69 |
| 2008/0163862 A1 | 7/2008 | Cartwright | | |

(Continued)

OTHER PUBLICATIONS

Journal of Cellular Plastics, "Physical Properties of Rigid Polyurethane Foams", R.K. Traeger, Sep. 1967, pp. 405-407 (Year: 1967).*

(Continued)

*Primary Examiner* — James O Hansen
(74) *Attorney, Agent, or Firm* — Merchant & Gould P.C.

(57) ABSTRACT

An outdoor structure includes a plurality of vertically extending walls joined together to form a standing structure surrounding an interior volume. Each of the walls includes a structural polymer panel and a veneer directly adhered to the structural polymer panel. The standing structure can be frameless and supportless. The standing structure can bear at least 90% of a load of the standing structure.

7 Claims, 4 Drawing Sheets

(56) References Cited

U.S. PATENT DOCUMENTS

| | | | |
|---|---|---|---|
| 2009/0081918 A1* | 3/2009 | Shen, Jr. | A63H 33/04 |
| | | | 446/85 |
| 2009/0235599 A1* | 9/2009 | Ware | B29C 65/5057 |
| | | | 52/309.9 |
| 2010/0148641 A1 | 6/2010 | Ehmke | |
| 2012/0213961 A1 | 8/2012 | Graham et al. | |
| 2013/0227902 A1* | 9/2013 | Van Sloun | E04C 2/296 |
| | | | 52/309.4 |
| 2014/0083033 A1 | 3/2014 | McIntosh et al. | |
| 2014/0083040 A1* | 3/2014 | Taylor, Jr. | E04C 2/04 |
| | | | 52/513 |
| 2015/0257596 A1* | 9/2015 | Vartanian | F21V 33/008 |
| | | | 99/325 |

OTHER PUBLICATIONS

AIREX® PXx fiber reinforced sheet of structural foam, Jul. 8, 2016.
Technical data sheet for Illbruck PU700 rapid curing gun grade polyurethane foam adhesive, Sep. 2014.
International Search Report and the Written Opinion for Application No. PCT/US2017/056545 dated Jan. 23, 2018, 15 pgs.

* cited by examiner

OUTDOOR STRUCTURE AND METHODS

TECHNICAL FIELD

This disclosure relates to a structure and methods of assembling the structure. Specifically, this disclosure relates to the use of structural polymer, adhesive, and veneer for a structure, such as an outdoor structure, e.g., a modular outdoor kitchen.

BACKGROUND

Outdoor kitchens have grown in popularity. Outdoor kitchens can be labor intensive and expensive to assemble, particularly if there is a desire to complement the appearance of the outdoor kitchen with the appearance of an adjacent house. Skilled masons, who can be needed to make the outdoor kitchen from brick or to apply a brick or stone face, are expensive.

What is needed is a product that reduces the amount of time and skill needed to construct an outdoor kitchen. Further, systems are needed that remain adaptable to individual needs, are lightweight, durable, and constructed from easy to handle materials. The product should be usable for the person who wishes to do it themselves.

SUMMARY

In general, an outdoor structure is provided that includes a plurality of vertically extending walls joined together to form a standing structure surrounding an interior volume. Each of the walls includes a structural polymer panel with a thickness of at least 1 inch and veneer directly adhered to the structural polymer panel. The standing structure will have a compressive strength of at least 25 psi, and the structural polymer panel and veneer of the walls bears at least 90% of a load on the standing structure.

In many cases, the thickness of the structural panel of polymer and veneer together is not greater than 6 inches.

The outdoor structure may further include a base horizontally supporting the standing structure. The base can include at least one structural polymer panel with a thickness of 1-6 inches.

In example embodiments, each of the walls includes the panel, a plurality of veneer members, and structural adhesive for bonding. The structural adhesive is between the structural polymer panel and each of the veneer members, and between adjacent veneer members.

In example embodiments, the standing structure defines an opening in communication with the interior volume. The outdoor structure further includes a frame and door assembly held in the opening.

In some examples, the outdoor structure further includes a grill assembly mounted on top of the standing structure and at least partially inside the interior volume.

In example embodiments, the outdoor structure further includes a counter top mounted on top of the standing structure.

In one or more example embodiments, the outdoor structure further includes a sink mounted on top of the standing structure and at least partially inside of the interior volume.

In example embodiments, the structural polymer panel comprises graphite polystyrene.

In another aspect, a kit for an outdoor structure is provided. The kit includes at least one structural polymer panel with a thickness of at least 1 inch, opposite top and bottom edges, and opposite side edges. The kit includes a plurality of veneer members and structural adhesive for directly bonding/adhering the veneer members onto the at least one structural polymer panel. A plurality of structural polymer panels with veneer members adhered to them can be used to form a frameless standing structure surrounding an interior volume, the standing structure having a compressive strength of at least 25 psi.

In another aspect, a panel arrangement for construction of a structure is provided. The panel arrangement includes a structural polymer panel having a thickness of at least 1 inch, the panel having a panel face and perimeter edges surrounding the panel face. Structural adhesive substantially covers the panel face. A plurality of veneer members each has a front surface, a back surface, and an outer periphery surrounding the front and back surfaces, and a thickness between the front and back surfaces of not greater than 4 inches. The plurality of veneer members are adhered directly to the panel face along the back surfaces with the structural adhesive, the veneer members also being adhered to adjacent veneer members along the outer periphery.

Methods of construction and use are provided herein.

BRIEF DESCRIPTION OF THE DRAWINGS

The accompanying drawings, which are incorporated herein, constitute a part of the description and illustrate several aspects of the present disclosure. In the drawings.

DETAILED DESCRIPTION

Figure 1:
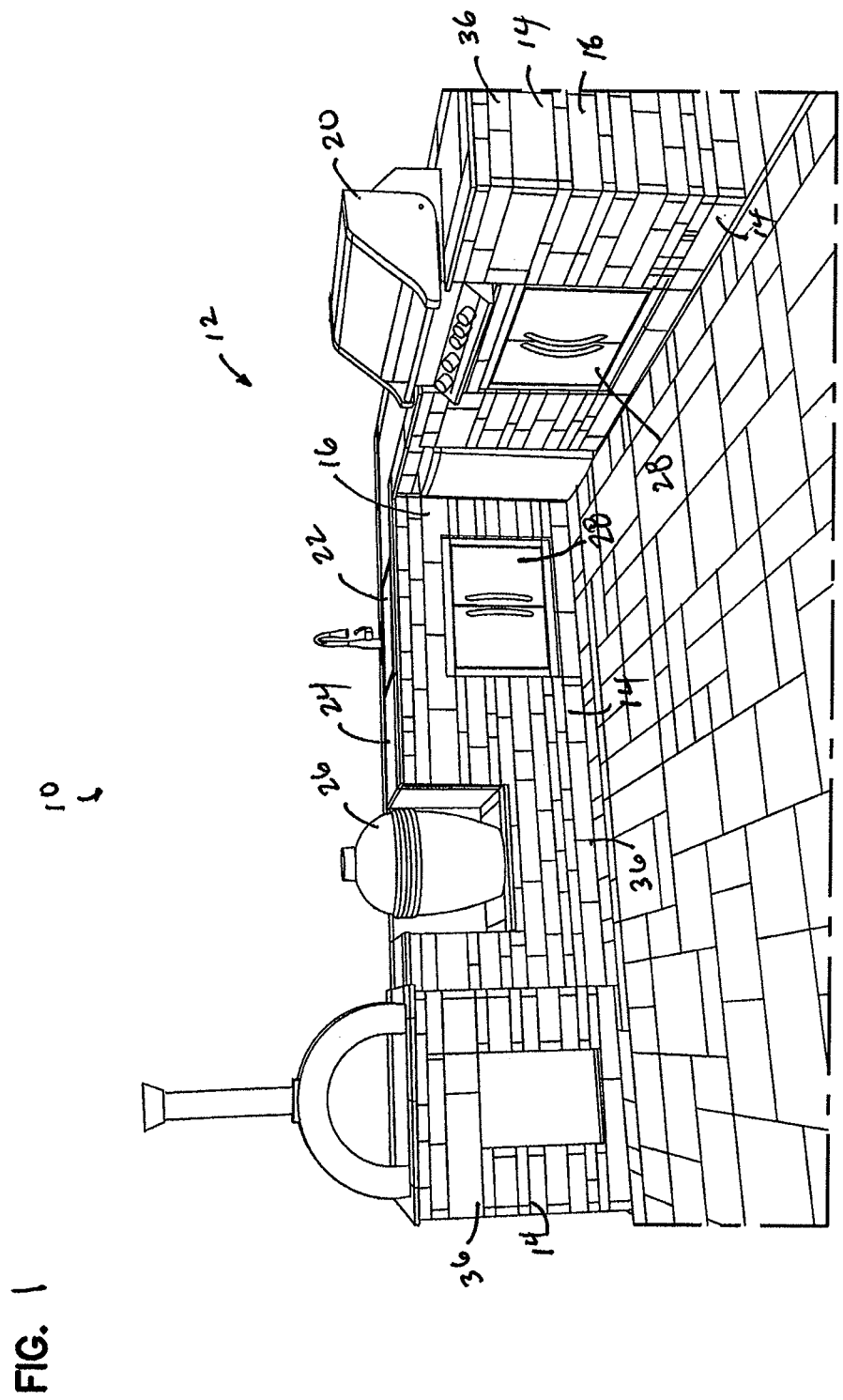
FIG. 1 is a perspective view of outdoor structures, utilizing structural polymer panels and veneer, constructed in accordance with the principles of this disclosure.

FIG. 1 illustrates a structure 10, which can be constructed using the materials and methods described herein. The structure 10, in this example, is an outdoor structure, specifically, an outdoor kitchen 12. The structure 10 can be an indoor structure, as well.

Figure 2:
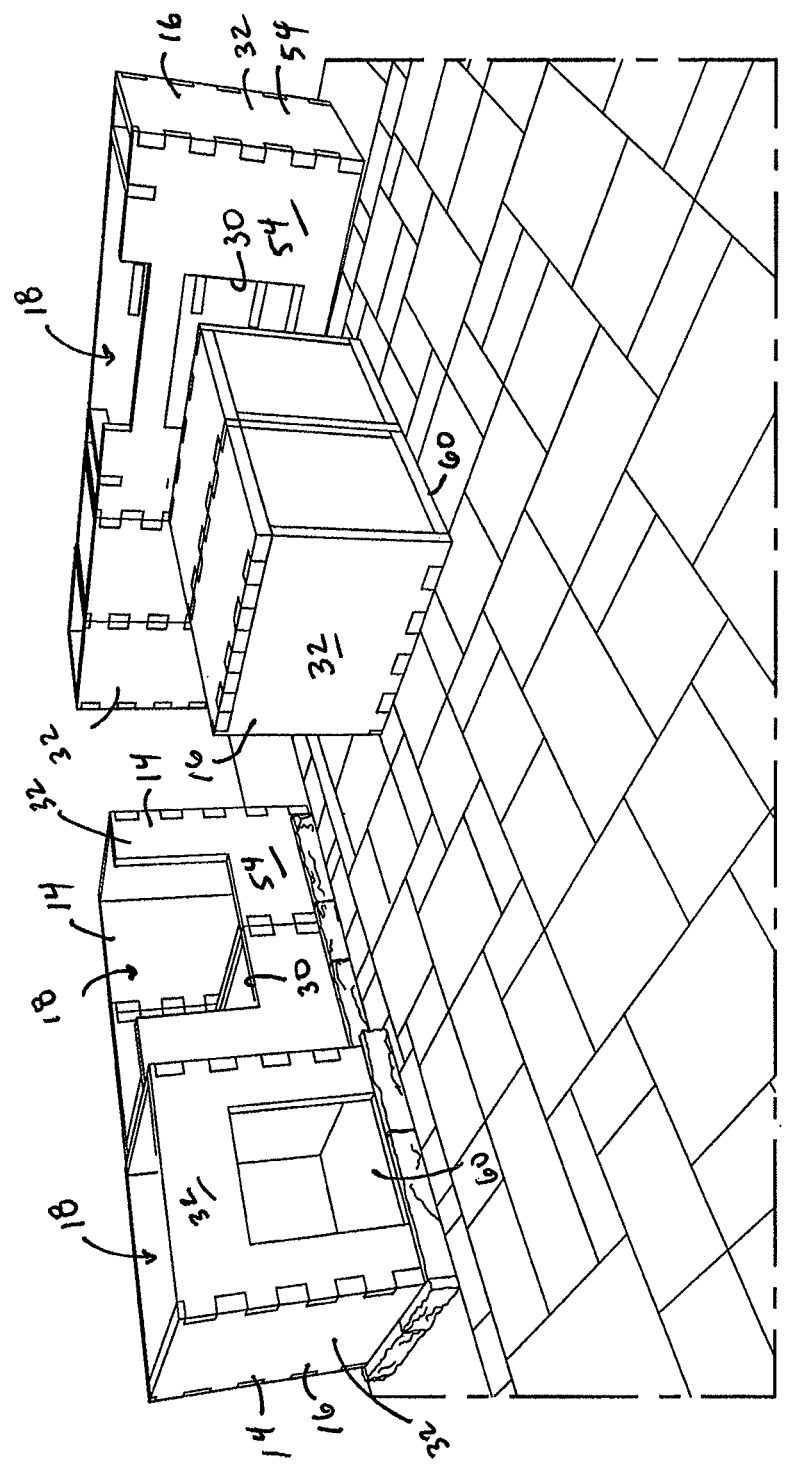
FIG. 2 is a perspective of the structural polymer panels of FIG. 1 being assembled, and before the veneer has been attached.

The outdoor kitchen 12, in this example, includes a plurality of vertically extending walls 14 joined together to form a plurality of standing structures 16 surrounding an interior volume 18 (FIG. 2). In this example, the outdoor kitchen 12 includes a grill assembly 20 mounted on top of a standing structure 16 and at least partially inside of the interior volume 18. A sink 22 is mounted on top of a standing structure 16 and at least partially inside of the interior volume 18. A countertop is 24 mounted on top of a standing structure 16. The counter top 24 can be granite, quartz, marble, or any type of commercially available countertop.

Still in reference to FIG. 1, the outdoor kitchen 12 can also include a smoker 26 supported by a standing structure 16, and it may include a frame and door assembly 28 held within an opening 30 (FIG. 2) in the standing structure 16 in communication with the interior volume 18. Many embodiments of the outdoor structure 10 are possible, and the example shown in FIG. 1 is just one of many possible embodiments. The standing structure 16 can support internal frames 56 (FIG. 3), which can be used for the door assembly 28 and/or windows.

Referring now to FIG. 2, each of the walls 14 includes a structural polymer panel 32. The panel 32 can include any structure that is stable, durable, breathable, adaptable to all climate zones, and resource efficient. For example, usable material for the structural polymer panel 32 can include cast or extruded polyisocyanurate (rigid urethane) or extruded polystyrene, polyethylene or polypropylene foam; particle foams including expanded polystyrene EPS, expanded polypropylene EPP, and expanded polyethylene EPE; or any extrudable, moldable or castable polymer or polymer foam.

One preferred example material for the polymer panel 32 is structural foam including, for example, graphite polystyrene. Graphite polystyrene is adaptable in size, thickness, shape, and density. It comes in a variety of thicknesses. It is versatile, in that it can be shaped or formed to the design needed. For example, the structural polymer panel 32 can be designed on a computerized design package and then cut to an exact form using CNC tooling. Graphite polystyrene is breathable and semipermeable, which is helpful in moisture management. It is adaptable to all climate zones, meaning that it can be used outdoors through both hot summers and cold winters. One preferred graphite polystyrene is available under the tradename NEOPOR from BASF Corporation.

The structural polymer panel 32 utilized for outdoor structures 10 can be made with a thickness that is appropriate for the outdoor structure 10. The greater the thickness is, the greater the compressive strength and the less likelihood of structural failure through crushing or buckling. The thinner the foam panel 32 is, the easier it is to handle and the less expensive it is. It has been found that for use in an outdoor kitchen to support things such as grill assemblies 20, sinks 22, granite countertops 24, smokers 26, etc., the structural polymer panel 32 should have a thickness of at least 1 inch. It has been found that the structural polymer panel 32, to work well in the outdoor kitchen 12, need not have a thickness any greater than 6 inches.

Each of the walls 14 includes veneer members 34 directly adhered to the structural polymer panel 32. The veneer members 34 can have an aesthetically pleasing appearance, to simulate the look of stone or brick. The veneer members 34 may be selected to complement the appearance of an adjacent house. By the term "directly adhered" it is meant that there is nothing in between the veneer members 34 and the structural polymer panel 32 other than structural adhesive that is used to attach the veneer members 34 to the structural polymer panel 32. One preferred embodiment of the veneer members 34 is a lightweight concrete veneer, but any type of veneer is usable.

Each of the veneer members 34 has a decorative front 80, an opposite back surface, and an outer periphery 82 (surrounding edges). Typical, usable veneer members 34 will have a thickness between the front 80 and back surface of not more than 4 inches, often 0.5-2 inches.

The structural adhesive is applied between the structural polymer panel 32 and each of the veneer members 34, along a vertical plane on the back surface, where the veneer members 34 are placed against the panel 32. The structural bond adhesive is also applied between all of the peripheral edges 82 of adjacent veneer members. This results in a composite panel 36, comprising the structural polymer panel 32, structural adhesive, and veneer members 34. In some embodiments, the composite panel 36 "consists of" or "consists essentially of" the structural polymer panel 32, structural adhesive, and veneer members 34.

Many different types of structural adhesives, or their equivalent, may be used. One type is polyurethane, for example, an aerosol dispensed, single part, moisture cured polyurethane adhesive. One structural adhesive useable herein is commercially available from Tremco under the name "ILLBRUCK masonry adhesive for brick and stone." The ILLBRUCK adhesive is PU700 rapid curing gun grade polyurethane foam adhesive and includes the following properties: polyurethane foam; fire class B3 using a test method DIN 4102; limits canister temperature of +10° C. to +30° C.; limits of ambient temperature of +5° C. to +35° C.; density of 20-30 kg/m3; open time of 8 minutes using a test method of 3 cm in width at 23° C. and 50% RH; tack free time of 8 minutes using a test method of 3 cm in width at 23° C. and 50% RH; cutting time of 24 hours using a test method of 3 cm in width at 23° C. and 50% RH; loading time of 24 hours; tensile strength of 10,000 kPa using a test method of DIN 53455; thermal conductivity of 40 mW/m·K; temperature resistance short term of −40° C. to +130° C.; temperature resistance long term of −40° C. to +90° C.; storage in shaded dry conditions between +10° C. and +25° C. with canisters upright; and a shelf life of 12 months when stored in original unopened containers. The structural adhesive, or its equivalent, has rapid curing (joint can be handled within 10 minutes and cure fully within 24 hours); is easy to use with no mixing, no water, no dust, and no specialized tools or equipment necessary; and has long term resistance to seawater, limewater, dilute acids and caustic solutions.

The thickness of the composite panel 36, being the structural polymer panel 32 plus the veneer member 34 and adhesive, will not be greater than about 6 inches, in order to have both sufficient strength, but without excessive weight or cost. Often, the thickness of the composite panel 36 will be 3-6 inches thick.

The composite panel 36, formed of the structural polymer panel 32, veneer members 34 and adhesive for each of the walls 14 of the standing structure 16 is load bearing. By "load bearing," this means that other structure, typically used to bear the load in like structures, is not needed. For example, standing structure 16 is free of internal frames (is frameless) and free of any other supports (is supportless). In particular, the composite panel 36 would bear at least 90%, for example, at least 95%, and preferably 98%-100% of a load of the standing structure 16. This leads to advantage, in the simplicity of the construction of the standing structure 16, the overall weight, and the inexpensiveness. In many examples, the standing structure 16 has walls 14 with load bearing capability that "consist of" or "consist essentially of" the composite panel 36.

Figure 4:
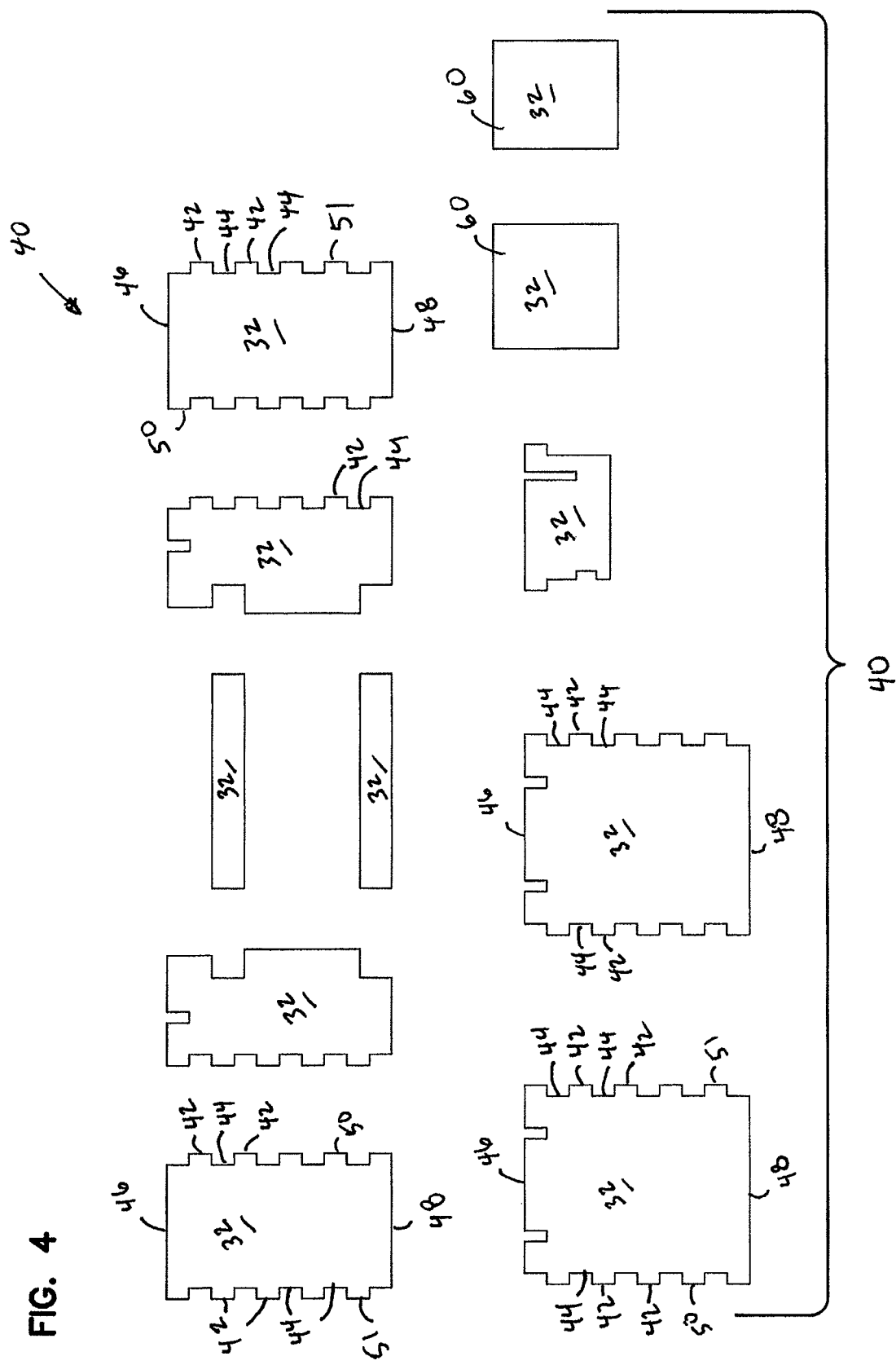
FIG. 4 illustrates a kit of structural polymer panels that can be used to assemble the outdoor structure of FIG. 1.

In reference now to FIG. 4, a kit is shown at 40. The kit 40 includes at least one of the structural polymer panels 32, which can be used to make the standing structure 16. The at least one foam panel 32 can be cut into a plurality of the panels 32, such as four panels 32. Alternatively, the kit 40 can include a pre-cut plurality of the foam panels 32. The kit 40 will often also include a plurality of the veneer members 34 and the structural bond adhesive. In FIG. 4, it can be seen how the foam panels 32 can be cut to specific unique shapes for whatever is the final structure 10 to be made.

The structural polymer panels 32, as shown in FIG. 4, are often precut for building the desired structure, such as outdoor kitchen 12. The structural polymer panels 32 can include a plurality of projections 42 alternating with recesses 44, such that the panels 32 can be easily mated together with the projections 42 from one panel 32 being received into recesses 44 of another panel 32 to form the standing structure 16. The panels 32 have opposite top and bottom edges 46, 48 and opposite side edges 50, 51. The projections 42 and recesses 44, in this embodiment, are formed along the side edges 50, 51.

The structural polymer panels 32 can be fitted together along the side edges 50, 51 and stood along the bottom edges 48 to form a frameless standing structure 16 surrounding the interior volume 18. Adhesive can be used between the side edges 50, 51 to secure the panels 32 together to form the standing structure 16.

The outdoor structure 10 may include a base 60 (FIGS. 2 and 4) horizontally supporting the standing structure 16. The base 60 can include at least one structural polymer panel 32 with a thickness of 1-6 inches.

Figure 3:
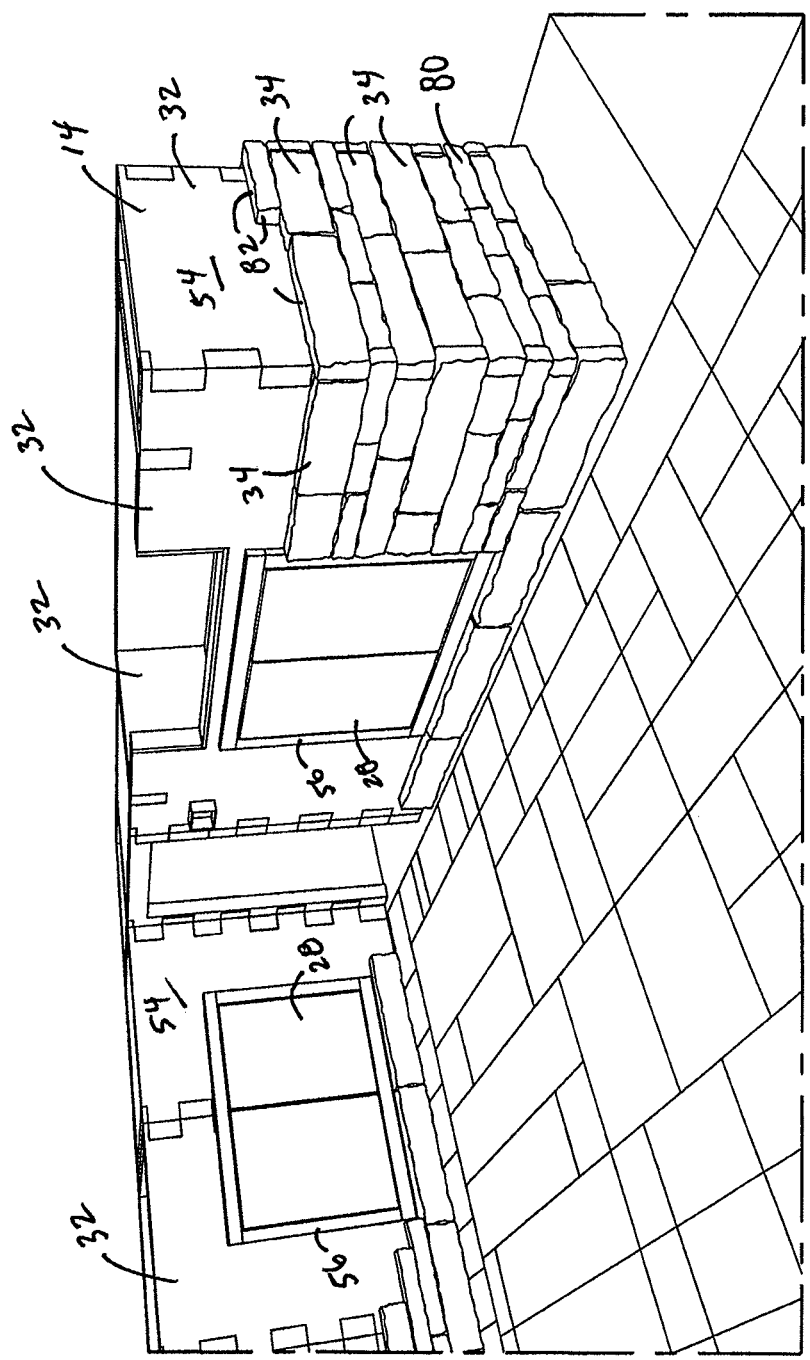
FIG. 3 is a perspective view of a portion of FIG. 1 depicting the step of attaching veneer to the structural polymer panels.

After the structural polymer panels 32 are fitted together to form the vertically extending walls 14 and the standing structure 16, the face 54 (FIGS. 2 and 3) of the panel 32 can receive the structural adhesive. In some instances, the structural adhesive can substantially cover the panel face 54. The veneer members 34 can then be applied to the panel face 54 against the structural adhesive. The structural adhesive is also applied between the edges of adjacent veneer members. The structural adhesive will adhere or bond the veneer members 34 to the panel face 54, as well as bond adjacent veneer members 34 to each other. FIG. 3 illustrates the step of applying the veneer members 34 to the panel face 54 of the structural polymer panels 32.

In one example, the resulting outdoor structure 10, which includes the standing structure 16, plus the grill assembly 20, plus the granite countertop 24, plus the steel frame and door assembly 28 weighed about 1,100 lbs. A prior art structure including the same grill assembly, countertop, and door, using concrete blocks adhered together instead of the composite panels 36, weighed about 3,500 lbs.

The panels 32 can be provided in the kit form 40, or they can be pre-assembled. The panels 32 can be made on the fly with a CNC tool, and they do not need to be molded.

When making outdoor structures 10, the panels 32 can have a thickness of 1-6 inches. Many types of structures can be constructed using composite panels 36 including, for example, columns, fountains, retaining walls, seawalls, tool sheds, animal shelters, etc. When the panels 32 are used for retaining walls or seawalls, the panels 32 will have a thickness of 6-12 inches.

EXPERIMENTAL

A test column was assembled using Neopor graphite Expanded Polystyrene EPD panels with a foam thickness of 2 inches; foam density of 2.0 lbs./CF; and outside dimensions of: 26.375"×36" (without veneering) with a 2"×22.375"×22.375" matching Neopor square panel glued in place to the inside walls and at the bottom of the test box. The weight testing includes an OSB panel with attached 2×4 cross members that was placed on top of the assembled test boxes to accommodate the test load pallet placement. Testing weight increments: (10) 4"×8"×12" units.

Test 1: Structural Polymer Panel Alone

The test column had a 3681 lbs. load (which included 61 lbs. platform and 50 lbs. pallet weight) placed on it, and it remained fully intact with no signs of cracking, breaking or damage. Under the 3681 lbs. load, the box compressed ⅛". At 3381 lbs., the compression was not measurable. The test column was calculated to have failed at 17.4 psi (compressive strength).

Test 2: Structural Polymer Panel and Veneer with Adhesive Only Along the Back Surface of the Veneer The text column as described above was used. Adhesive used with the veneer was Oldcastle Structure Bond™ adhesive (aerosol Urethane). This adhesive is available commercially under the brand name Illbruck PU700, as described above. The test column had concrete veneer (1.5 inches thick) glued to it with the structural bond adhesive. The structural adhesive was not applied between edges of adjacent veneer members.

With a 6502 lbs. load (which includes 61 lbs. platform, a 51 lbs. pallet and 50 lbs. pallet weight), the column remained fully intact, but revealed some vertically cracked units on all 4 sides, which was deemed to have failed. At the 6212 lbs. loading vertical cracks were not visible. The test column was calculated to have failed at 21.2 psi (compressive strength).

Test 3: Structural Polymer Panel and Veneer with Adhesive Along the Back Surface of the Veneer and Between Edges of Adjacent Veneer Members The test column as described above was used. Adhesive used with the veneer was Oldcastle Structure Bond™ adhesive (aerosol Urethane). The test column had concrete veneer (1.5 inches thick) glued to it with the structural adhesive. The structural adhesive was also applied along between the edges of adjacent veneer members.

With 10,666 lbs. load (which includes a 61 lbs. platform, a 51 lbs. pallet and two 51 lbs. pallets weight) the column remained fully intact with no cracking, breaking or damage of any kind. For safety reasons, the testing was terminated due to height concerns. The test column was calculated to have at least a 34.8 psi (compressive strength).

CONCLUSION

Using structural panels of polymer with veneer attached to the structural panels of polymer and attached along adjacent veneer edges with structural adhesive results in a structure that is at least 3 times as strong when using only structural panels of polymer, and more than 1.5 times as strong when only applying the adhesive between the foam and the veneer. Using structural polymer panels with veneer attached to the foam and attached along adjacent veneer edges with structural adhesive results in a structure that has a compressive strength of greater than 21.2 psi; indeed, greater than 25 psi, 30 psi, and 34 psi. The upper limit was not determined, as testing had to be stopped for safety reasons.

What is claimed is:

1. An outdoor kitchen comprising:
at least three structural panels of polymer, each having a thickness of at least 1 inch, and each having side edges;
each of the panels further including a plurality of veneer members directly adhered to and covering the panel with structural adhesive; the structural adhesive being (i) between the panel and each of the veneer members; and (ii) between peripheral horizontal and vertical edges of adjacent veneer members, to result in composite panels made from: the structural panel of polymer, the veneer members, and the structural adhesive;
the composite panels being vertically extending and fitted together along the side edges to form a standing structure having corners and surrounding an interior volume;
at least one of a grill assembly, countertop, or sink comprising at least a portion of a vertically applied load supported by the standing structure; and
wherein the standing structure has a compressive strength of at least 25 psi and bears at least 90% of the vertically applied load on the standing structure.

2. The outdoor kitchen of claim 1 wherein the standing structure defines an opening in communication with the interior volume; and a frame and door assembly are held in the opening.

3. The outdoor kitchen of claim 1 wherein each panel comprises graphite polystyrene.

4. The outdoor kitchen of claim 1 wherein the panel and veneer of each of the wall bears at least 95% of the vertically applied load on the standing structure.

5. The outdoor kitchen of claim 1 wherein at least some of the panels include a plurality of projections alternating with recesses along the side edges to permit adjacent panels to be mated together at the corners with projections from a first panel being received into recesses of a second panel.

6. The outdoor kitchen of claim 1 wherein the standing structure is frameless.

7. The outdoor kitchen of claim 1 wherein the veneer members simulate an appearance of stone or brick.

\* \* \* \* \*